May 11, 1965  J. M. KENDALL ETAL  3,182,509
HIGH PRECISION MANOMETER

Filed March 30, 1961  5 Sheets-Sheet 1

INVENTORS:
J. M. KENDALL
G. W. PAYNE
BY
*W. E. Quesenberry*
*J. L. Hodges*
ATTYS.

May 11, 1965     J. M. KENDALL ETAL     3,182,509
HIGH PRECISION MANOMETER

Filed March 30, 1961     5 Sheets-Sheet 3

INVENTOR
J. M. KENDALL
G. W. PAYNE

BY

ATTORNEY

May 11, 1965     J. M. KENDALL ETAL     3,182,509
HIGH PRECISION MANOMETER

Filed March 30, 1961     5 Sheets-Sheet 4

INVENTORS.
J. M. KENDALL
G. W. PAYNE
BY W. O. Quesenberry
    Hodges
        ATTYS.

May 11, 1965 J. M. KENDALL ETAL 3,182,509
HIGH PRECISION MANOMETER
Filed March 30, 1961 5 Sheets-Sheet 5

INVENTORS.
J. M. KENDALL
G. W. PAYNE

BY *W. O. Quesenberry*
*O. E. Hodges*
ATTORNEYS.

United States Patent Office 3,182,509
Patented May 11, 1965

3,182,509
HIGH PRECISION MANOMETER
James M. Kendall, Coral Hills, and George W. Payne, Silver Spring, Md., assignors to the United States of America as represented by the Secretary of the Navy
Filed Mar. 30, 1961, Ser. No. 99,638
3 Claims. (Cl. 73—393)
(Granted under Title 35, U.S. Code (1952), sec. 266)

The invention described herein may be manufactured and used by or for the Government of the United States of America for governmental purposes without the payment of any royalties thereon or therefor.

The present invention relates in general to pressure reading apparatus and more particularly to a precision manometer for obtaining precision measurements of small pressures regardless of ambient temperature.

This invention is an improvement in the precision micromanometer described and claimed in U.S. Patent No. 2,948,186 and would have general utility in a supersonic or hypersonic wind tunnel where it is desirable to get highly accurate readings directly because of the unusual high cost per hour of operating a wind tunnel.

A manometer can be used to measure differential pressures. The reference pressure can be any pressure from atmospheric down to a vacuum of $10^{-4}$ mm. Hg, depending on the purpose for which the manometer is used. Since the manometer is a primary pressure standard, it is especially useful for calibrating transducers and other pressure measuring devices, for making leakage tests, for use in wind tunnel tests, especially at hypersonic Mach numbers where pressures to be measured are low and where one or only a few pressures are to be measured, in low speed subsonic flows for use with Pitot static probes to measure speeds down to a few feet per second and other similar uses.

Manometer apparatus of the character mentioned comprises means, such as a manometer tube supporting a column of liquid in combination with means for applying the pressure to be measured to the column which causes a corresponding difference in the level of the liquid column. The level of the liquid column is usually measured by reference to a scale along side of the manometer tube for reading the position of the miniscus of the liquid column. Such a system is not very accurate because of the volume change in the liquid due to the ambient temperature. For example, if there is a high ambient temperature, the liquid in the manometer will expand giving an inaccurate high reading, and if there is a low ambient temperature the liquid in the manometer contracts thereby giving a low reading.

The pressure measuring equipment of this invention consists principally of a manometer tube with necessary valves, a vacuum or pressure reference system, special illumination which allows the miniscus position to be accurately determined and a temperature correlated apparatus for accurately determining the true reading of the column in the manometer.

It is therefore an object of the present invention to provide a new and improved manometer apparatus for precision measurements of small pressures.

Another object is to provide a new and improved manometer apparatus employing a self-contained means for illuminating and registering the location of the miniscus position.

Another object is to provide a new and improved manometer apparatus for taking a precision measurement of the fluid in the manometer regardless of the ambient temperature.

Still another object is to provide a new and improved manometer apparatus that will utilize either A.C. or D.C. current for lighting and projecting an optical image of the curved surface of the miniscus on a screen or recording apparatus.

A further object is to provide, in a manometer apparatus, a compensating device for accurately determining the true reading of the manometer regardless of the ambient temperature or the location of the liquid in the manometer.

A still further object is the provision of a vertically adjustable optical system and vernier scale slidable relative to a manometer tube and an associated scale for reading the connected position of the miniscus of the liquid column in the tube.

Other objects and many of the attendant advantages of this invention will be readily appreciated as the same becomes better understood by reference to the following detailed description when considered in connection with the accompanying drawings wherein.

Figure 1:
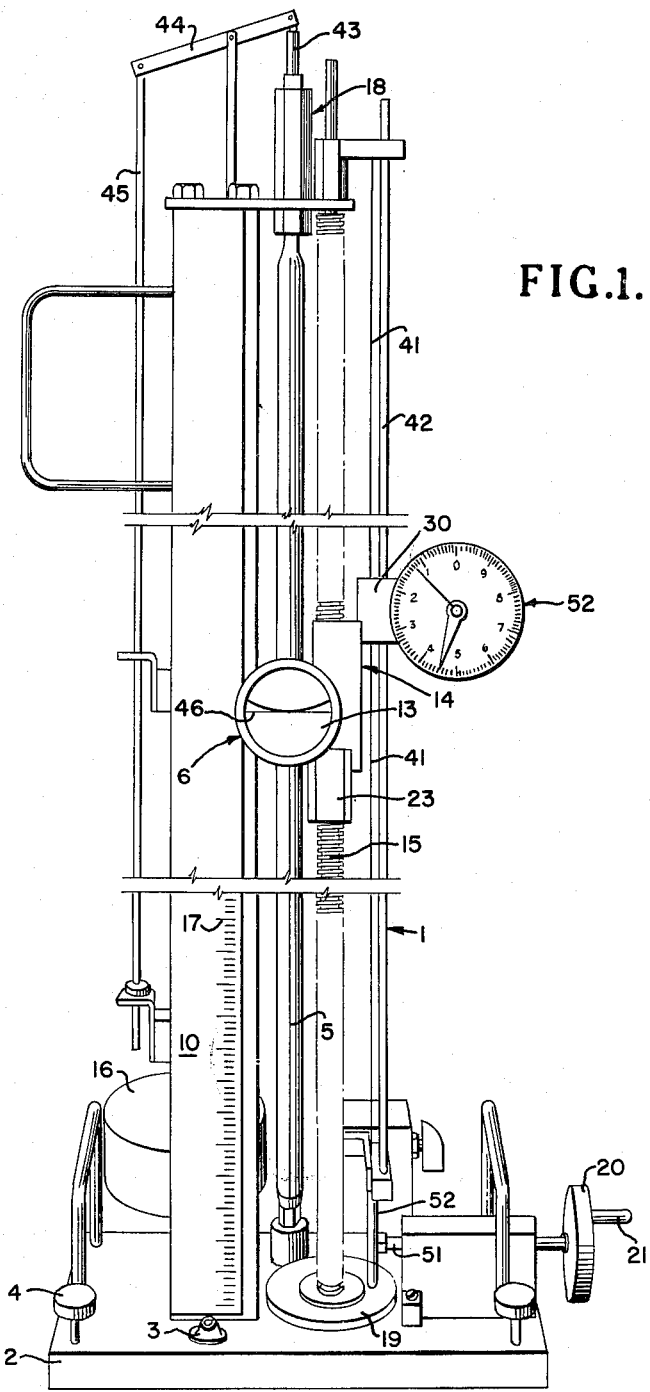
FIG. 1 is a front elevation view of one embodiment of the invention.

Referring now to the drawings, wherein like reference characters designate like of corresponding parts throughout the several views, there is shown in FIG. 1, which illustrates a preferred embodiment, an arrangement for measuring pressures comprising a manometer apparatus, designated generally by reference numeral 1.

Figure 2:
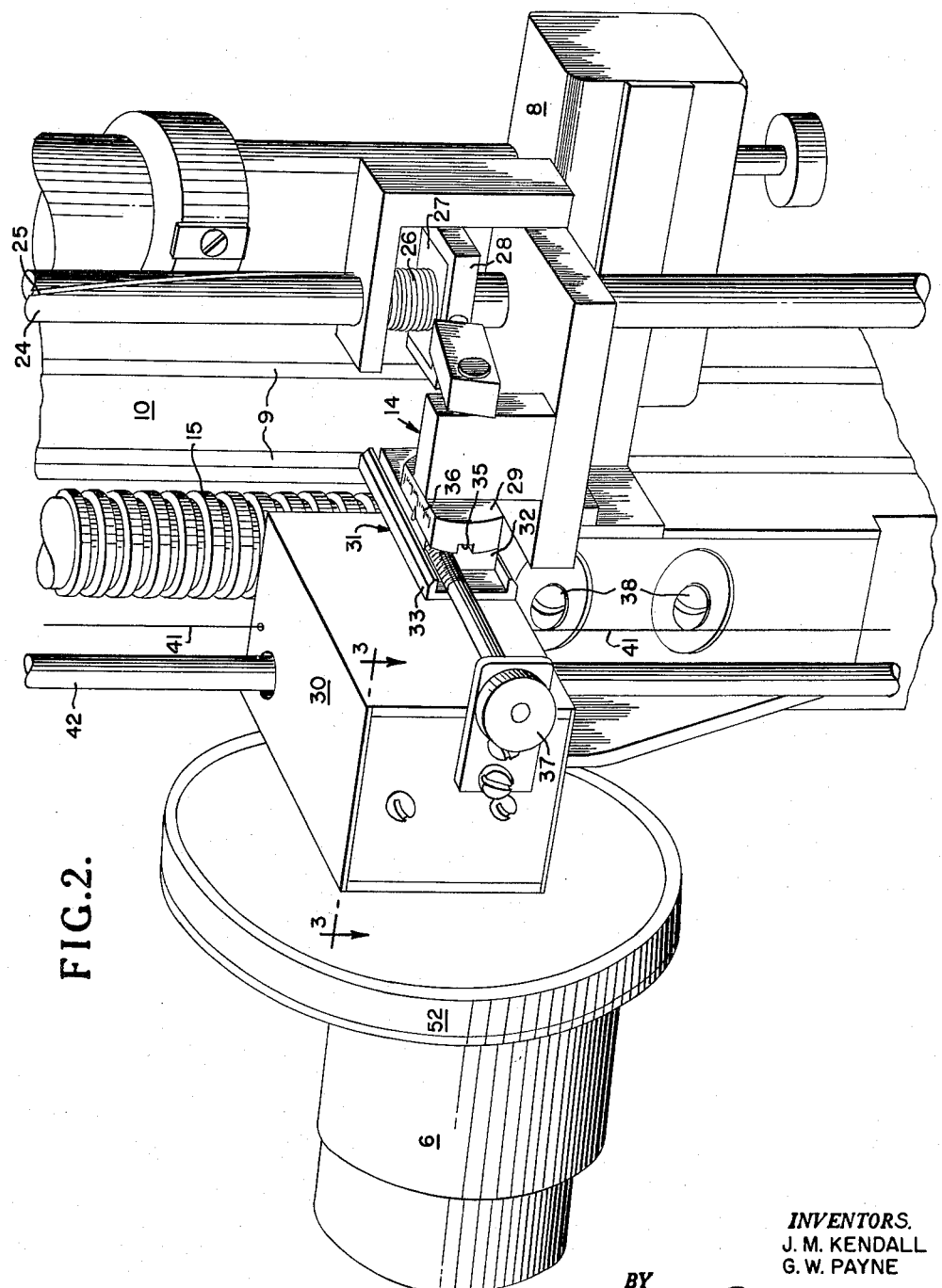
FIG. 2 is a side elevational view of the temperature compensating unit.

In FIG. 1 there is shown an apparatus embodying the base form of the invention in which the base 2 is a plate of steel ½ inch thick. For leveling there is a circular level 3 with three leveling screws 4 for supporting the base. The manometer tube 5 is provided with a vertical adjustable optical system 6 and a light source such as a light bulb 7 enclosed in chamber 8 as shown in FIG. 2 and movable therewith. The light source not being shown in FIGURE 1 because it is behind the optical system in chamber 8 but its relation thereto may be appreciated by reference to FIG. 5.

Electrical contact is made to the lamp by a pair of bolts electrically isolated from the base and extending through to either side of the base making electrical contact with a pair of electrical tracks 9 shown in FIG. 2 which is mounted on column support 10 on which sliding contacts, not shown, will carry current to the light source for the optical system 6.

Figure 5:
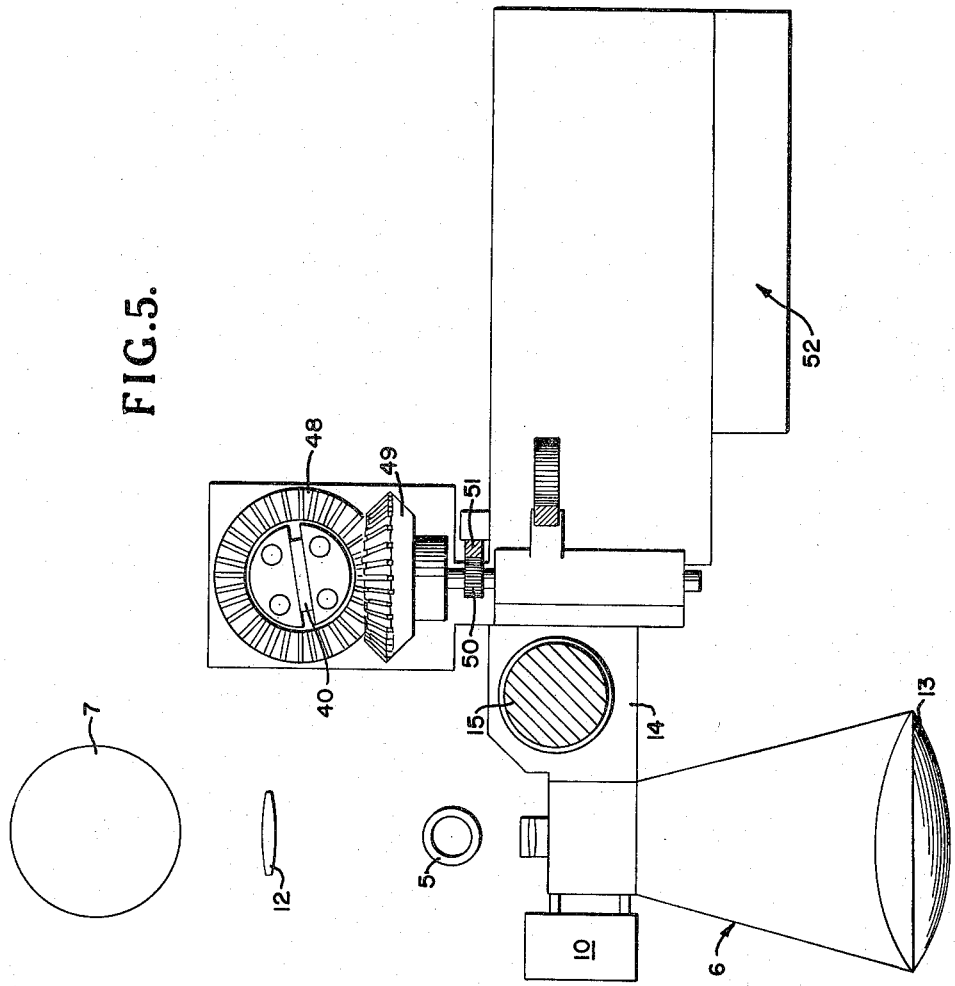
FIG. 5 is a top elevational view of FIG. 4.
Figure 6:
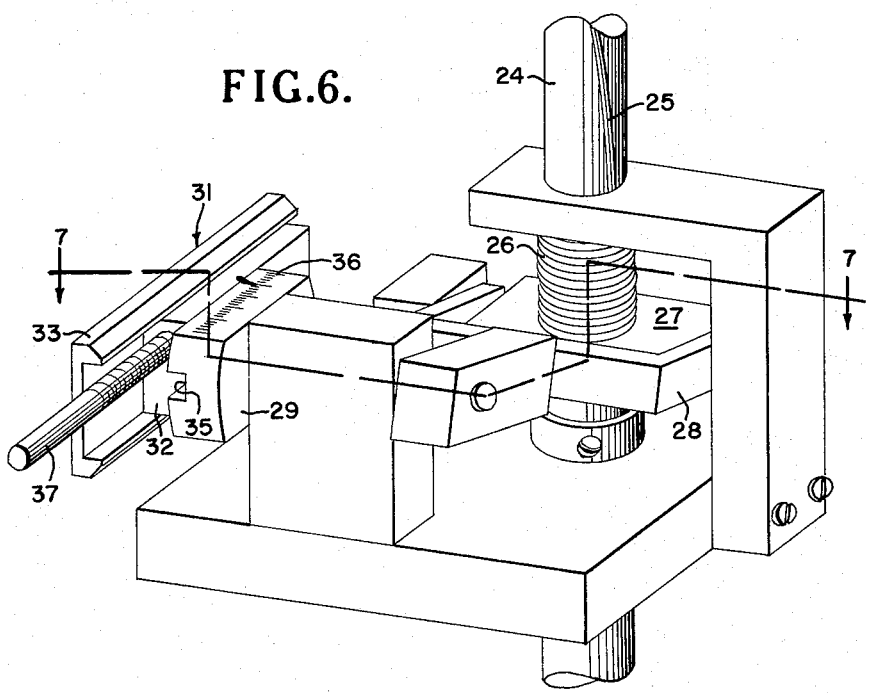
FIG. 6 is an enlarged elevational view of the temperature compensating mechanism of FIG. 2.
Figure 7:
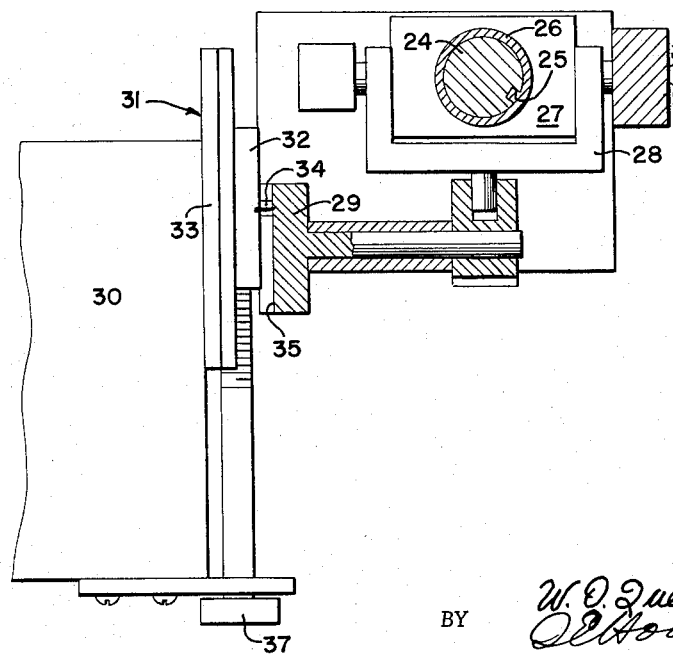
FIG. 7 is an elevational view partly in section of the temperature compensating mechanism taken along lines 7—7 of FIG. 6.

Referring now to FIG. 5 wherein the optical system 6 consists of a lamp bulb 7, a condensing lens 12 and a ground glass screen 13. All these parts are mounted on a movable carriage 14 which is generally supported by a lead screw 15. Two ball bearing rollers, not shown, roll up and down on the vertical column support 10 and guide the movable carriage to prevent it from rotating with the lead screw 15 when the vertical position of the carriage is changed.

Referring now to FIG. 1 the apparatus comprises a base 2 and a column support 10 which extends vertically, when viewed with respect to the drawings, from the base and supports the upper end of the valve system housing 18. Tank 16 is mounted on the back of the base with a connecting tube beneath the base connecting tank 16 with the manometer tube 5. The tank being rather large and contains a large reservoir of mercury or other suitable liquid that can be used in a manometer. The column support 10 has a calibrated scale 17 attached thereto for indicating the height of the mercury in the manometer tube in millimeters.

Adjacent to the manometer tube and disposed parallel thereto, is a lead screw rod 15 which is journaled for rotation and carries a circular wheel 19 at the lower end thereof and rotatable therewith, the lead screw rod being suitably connected to shaft 51 by friction wheel 52 which may be rotated by turning a hand wheel 20 with handle 21.

The optical system 6 and the light source 7, not shown, associated therewith are carried by a movable carriage 14 which is connected to the lead screw rod 15, by means including a conventional spring-pressed, split-nut, throw-out mechanism 23, whereby rotation of the screw threaded rod moves the carriage vertically, yet the carriage may be disconnected from the rod and moved by hand to any point on the rod. One end of the carriage is supported on the screw threaded rod, the other end of the carriage having attached thereto a pair of rollers, not shown, engaging the adjacent support column 10 thereby slidably supporting one portion of the carriage.

Adjacent and parallel to the screw threaded rod 15 is a bar 24 shown in FIG. 2, with a helical groove 25 inscribed therein. The bar 24 is fixedly attached to base 2. The helical groove is inscribed in the bar 24 in such a manner that it makes two revolutions around the bar over its entire length.

The temperature compensation means as disclosed is a manual adjustment which is based on the ambient temperature as compared to a standard such as, for example, the temperatures at which the manometer was calibrated. This compensation is designed for varying the change in volume of the manometer liquid as the volume of the manometer changes. That is, if the ambient temperature increases, for example, causing the volume to increase, such increase will be proportional to the volume liquid in the manometer and hence the compensation must increase as the volume of liquid in the manometer increases. This compensation is provided for by rod 24 with spiral groove 25 and the linkage mechanism connected between rod 24 and the vernier scale device 30.

Figure 3:
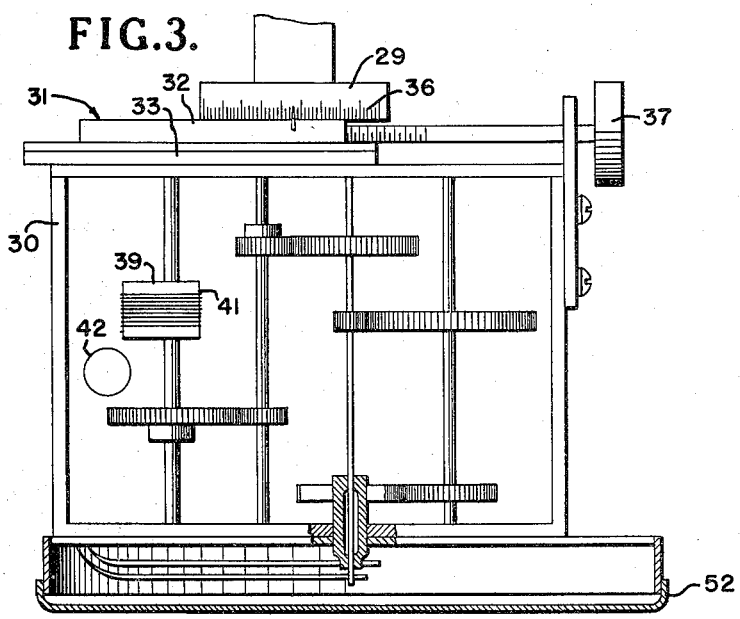
FIG. 3 is a detail view of the driven train of the indicator on the movable carriage as shown in FIG. 1.

The T-shaped member 29 is rotated by the movement of forked shaft 28 which is linked to nut 27 and to T-shaped member 29 to cause T-shaped member 29 to rotate when nut 27 is raised or lowered by the rotation of grooved bushing 26 which in turn is rotated by a pin attached thereto which engages groove 25 of shaft 24. T-shaped member 29 has a horizontal groove for slidable engagement with a lug 34 of a slidable block member 32. Slidable block member 32 is horizontally slidable within grooved housing 33 which is fixedly attached to the vernier scale device 30. The horizontal position of the slidable block member 32 is determined by knurl screw 37. In setting the temperature compensation, the knurl screw 37 is turned until the arrow or index pointer on slidable block 32 is pointing to the value on scale 36 corresponding to the ambient temperature. This setting determines the position of lug 34 with respect to the axis of rotatable T-shaped member 29. When lug 34 is coaxial with the axis of rotation of the T-shaped member 29, there is no temperature compensation. However, when a temperature compensation is set into the system by turning knurl screw 37, lug 34 will be displaced from the axis of rotation of T-shaped member 29, and the rotation of the T-shaped member 29 by rotation of bushing 26 will cause lug 34 to move up or down, depending on the displacement of lug 34. This movement will cause drum 39 to rotate thus causing the vernier scale 52 to be moved by the amount of temperature compensation set into the system. This temperature compensation will change as the volume of liquid in the manometer changes by the rotation of bushing 26 as it moves up or down, engaging the spiral groove 25 of bar 24. A pair of tungsten wires 41 as shown in FIG. 1 are attached to the bottom of the carriage and to the top of the column support 10 are both wound around drum 39, FIG. 3, as the carriage moves up and down on the lead screw, one of the tungsten wires is wound onto the drum 39, the other tungsten wire is unwound from the drum 39 at the same rate. This driving device is used to drive the gear box of the vernier scale device as shown in FIG. 3. The vernier scale is correlated so as to correspond with the scale on the column support 10, the short hand on the vernier reading in tenths of a millimeter and the long hand on the vernier scale reading in hundredths of a millimeter. The vernier scale device is so constructed that upon one complete revolution of drum 39 the carriage has travelled approximately four inches, the course hand on the vernier scale has travelled one-tenth of a revolution and the small hand of the vernier scale has travelled ten revolutions. Therefore, by interpolating the scale it is possible to read directly off the scale to the thousandths place. Directly in front of the tungsten wire 41 as shown in FIG. 2 is a rod 42 which protects the fine tungsten wire from accidental contact.

In operation the valve housing 18 of FIG. 1 contains two nipples not shown, which are connected to two different sources; one source being the reference pressure, for example, a vacuum, and the other source being connected to the model or wind tunnel being tested. At the desired time the manometer tube is transferred from the known pressure source to the unknown pressure source by a valve plunger 43 which is connected to a rocker arm shaft 44, the rocker shaft 44 being suitably connected to the plunger shaft 45. In operation, the plunger is positioned so that the liquid column in the manometer tube is subject to the pressure transmitted from the model or wind tunnel. After the pressure conditions have stabilized, use is made of the split-nut, throw-out mechanism to disconnect the carriage from the screw threaded rod and position the optical system and the associated light source approximately on line with the meniscus after which the split-nut, throw-out mechanism is released to connect the carriage to the screw threaded rod. The screw threaded rod is then rotated by means of a hand wheel associated therewith until the image of the meniscus is brought into proper registration with the cross hair 46 on the ground glass screw 13 as shown in FIG. 1. As the vernier scale device is moved up or down on the carriage assembly the temperature compensating unit moves a predetermined amount depending upon the abient temperature. The true reading of the manometer may be now taken directly from the scale on the vertical support and the two hands on the vernier scale device.

Figure 4:
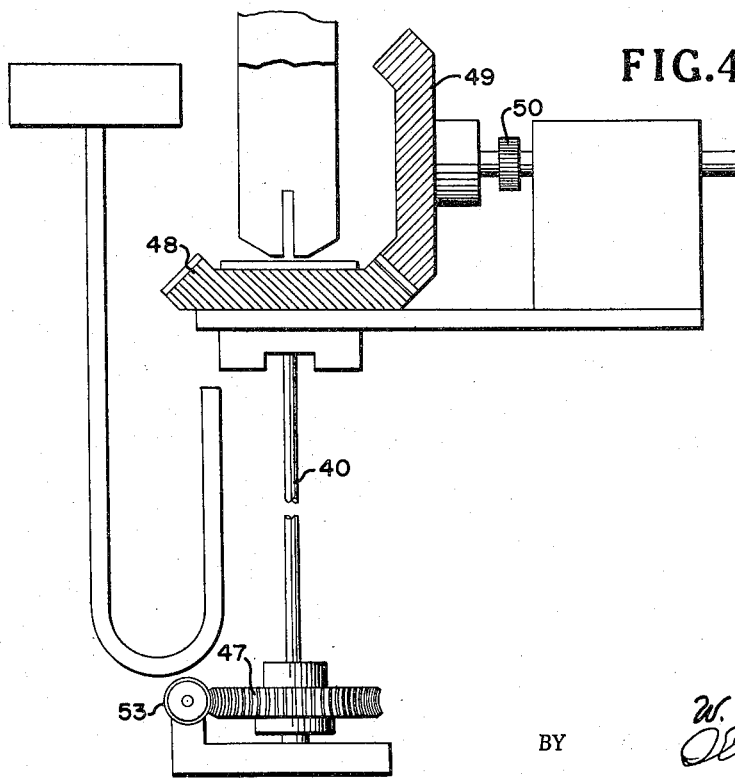
FIG. 4 is a front elevational view of another embodiment of the invention.

Although the manometer has been described as a straight glass tube connected to a tank reserve which may or may not be connected to a standard pressure, as the case may be, it is considered obvious that other types of manometer tubes could be used. For example, the tube could be U-shaped. FIGS. 4 and 5 disclose an alternate method of obtaining the necessary temperature compensating means. In FIG. 4 the helical groove rod 24 has been replaced by a strip of blued spring steel 40. The spring steel strip has been solidly attached at the top and bottom of the unit. The bottom being rotatable by a worm 53 and pinion gear 47, a predetermined amount depending upon the ambient temperature. This gives the strip of spring steel a helical configuration. The helical shape of the spring steel causes gear 48, shown in FIGS. 4 and 5, to be rotated which in turn causes miter gear and shaft 49 to rotate. As the miter gear and shaft 49 rotate they also rotate a smaller pinion gear 50 which is also connected to the shaft. As pinion gear 50 rotates a rack 51 connected thereto, as shown in FIG. 5, moves up or down with respect to the movable carriage. As the rack 51 moves up or down the vernier scale 52 attached thereto moves relative to the movable carriage unit 14 thereby correctly compensating for the ambient temperature.

While different means have been disclosed for obtaining precision measurements of pressures, it should be understood, that the foregoing disclosure relates only to preferred embodiments of the invention and that numerous modifications or alterations may be made without departing from the spirit and the scope of the invention.

What is claimed is:

1. A manometer for determing the fluid pressure of testing apparatus connected thereto, said manometer having a temperature compensating unit, an upright pressure indicating column having a quantity of liquid therein and adapted to be subjected to the pressure of a testing apparatus, a scale fixed adjacent to said column for indicating the height of a liquid in the column, a screw threaded rod rotatably mounted parallel to said column, means for rotating said rod, a moveable optical system mounted on said screw threaded rod and moveable by said rotating means to a position corresponding to the height of said liquid in the column, a temperature compensating means slidably mounted on said optical system and settable to the ambient temperature for automatically varying the compensation for variations in volume of the liquid due to ambient temperature according to the height of the liquid in said column whereby a temperature corrected height of liquid in said column may be ascertained, said temperature compensating means including a bar parallel to said liquid column and having a two turn spiral groove inscribed therein, a bushing mounted on said bar having a lug slidably engaging said groove, said bushing having a threaded outer surface, a threaded nut engaging the threaded surface of said bushing, said nut having first shaft means, projecting radially from said nut, connecting rod means having bearing means at one end thereof for rotatable engagement with said first shaft means, a rotatable block means having a horizontally disposed slot on one side thereof and a second shaft means projecting outwardly from the other side of said block and fixedly attached thereto, a bearing support rotatably supporting said second shaft means, means fixedly connecting the other end of said rod means to said second shaft means, vernier scale means slidably connected to said optical means for indicating a temperature corrected height of said liquid in said column, horizontally disposed channel means fixedly attached to said vernier scale, slidable block means slidably engaging said channel means, said slidable block means having a projecting lug pivotally and slidably engaging the horizontally disposed slot in said rotatable block means, means adjusting the position of said slidable block in accordance with the ambient temperature whereby the corrected height of the liquid column may be read directly.

2. A manometer of the well type having a pressure indicating liquid column, an optical means movable in a parallel relation to said liquid column for accurately measuring the level of said column, a scale mounted adjacent said liquid column and correlated to the optical system, a vernier scale slidably mounted on said optical means and correlated with said scale, a spiral grooved shaft mounted parallel to said liquid column, temperature compensating means connected between said spiral grooved shaft and said vernier scale for compensating for a change in the liquid column level due to a change in ambient temperature, said temperature compensating means including a bushing surrounding said grooved shaft and having a lug engaging the groove of said grooved shaft, said bushing having a threaded outer surface, a nut means threadedly engaging the threaded outer surface of said bushing, a pair of shafts diametrically opposed and extending radially from said nut means, a connecting rod having a bifurcated portion at one end rotatably engaging said pair of shafts and fixedly connected at the other end to one end of a shaft means, rotatable support means on said shaft means, a rotatable block fixedly attached to one end of said shaft means on one side thereof and having a horizontally disposed slot on the other side thereof, a channel means fixedly attached and horizontally disposed on said vernier scale, a slidable block slidably engaging said channel and having a lug portion projecting therefrom, said lug portion rotatably and slidably engaging the horizontally disposed slot in said rotatable block, means adjusting the horizontal position of said slidable block whereby a desired temperature compensation may be set into said temperature compensation means and a direct true reading of the liquid column may be obtained.

3. A direct reading manometer for determining various fluid pressures comprising a plate, a liquid filled manometer tube responsive to a pressure differential of a compressible fluid affixed to said plate, a linear lead screw adjacent and parallel to said manometer and rotatably affixed to said plate, a bar having a two turn spiral groove inscribed therein located adjacent and parallel to said linear lead screw and rigidly mounted on said plate, a first follower including an optical system mounted on said lead screw and selectively movable up or down by said lead screw, for following the meniscus of the liquid in the manometer, said first follower also having a scale means slidably mounted thereon for indicating the relative position of said follower, a second follower means mounted on said spiral bar, means connecting said first follower to said second follower for adjusting the slidable scale means to compensate for ambient temperature whereby the slidable scale means will directly provide the true reading of the location of the meniscus, said second follower means including a bushing on said bar with a lug engaging said groove, said bushing having an externally threaded surface, nut means threadedly engaging said bushing, said nut means having shaft means extending radially therefrom, a connecting member rotatably engaging said shaft means at one end thereof and fixedly attached to a second shaft means at the other end thereof, means rotatably supporting said second shaft means, a rotatable block having a horizontal groove therein on one side thereof and fixedly attached to said second shaft means on the other side thereof for rotation therewith, a channel horizontally disposed and fixedly attached to said scale, a slidable block slidably engaging said channel, said slidable block having a lug portion projecting therefrom, said lug portion slidably and rotatably engaging the horizontal slot of said rotatable block, threaded shaft means threadedly engaging said slidable block such that the position of said slidable block may be positioned for a desired temperature correction.

References Cited by the Examiner

UNITED STATES PATENTS

| 2,693,113 | 11/54 | Hejduk | 73—401 X |
| 2,722,641 | 11/55 | Cross | 73—401 X |
| 2,841,011 | 7/58 | Mayes et al. | 73—401 |
| 2,857,760 | 10/58 | Heuver | 73—147 |
| 2,872,814 | 2/59 | Brown | 73—401 |
| 2,872,815 | 2/59 | John | 73—401 |

RICHARD C. QUEISSER, *Primary Examiner.*

CHARLES A. CUTTING, EMIL G. ANDERSON,
*Examiners.*